(12) United States Patent
Wei et al.

(10) Patent No.: US 11,496,927 B2
(45) Date of Patent: Nov. 8, 2022

(54) METHODS AND INFRASTRUCTURE EQUIPMENT

(71) Applicant: Sony Corporation, Tokyo (JP)

(72) Inventors: Yuxin Wei, Basingstoke (GB); Vivek Sharma, Basingstoke (GB); Kazuyuki Shimezawa, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 17/040,986

(22) PCT Filed: Mar. 11, 2019

(86) PCT No.: PCT/EP2019/056003
§ 371 (c)(1),
(2) Date: Sep. 24, 2020

(87) PCT Pub. No.: WO2019/185340
PCT Pub. Date: Oct. 3, 2019

(65) Prior Publication Data
US 2021/0099914 A1  Apr. 1, 2021

(30) Foreign Application Priority Data

Mar. 27, 2018 (EP) .................................. 18164439

(51) Int. Cl.
*H04W 28/16* (2009.01)
*H04W 72/04* (2009.01)

(52) U.S. Cl.
CPC ......... *H04W 28/16* (2013.01); *H04W 72/042* (2013.01)

(58) Field of Classification Search
CPC ................. H04W 28/16; H04W 72/04; H04W 36/00837; H04W 88/085; H04W 36/0083;
(Continued)

(56) References Cited

U.S. PATENT DOCUMENTS

| 7,646,752 B1 * | 1/2010 | Periyalwar | H04L 41/044 |
| | | | 455/445 |
| 8,483,734 B2 * | 7/2013 | Einhaus | H04W 72/0453 |
| | | | 455/448 |

(Continued)

FOREIGN PATENT DOCUMENTS

EP      2448354 A1    5/2012

OTHER PUBLICATIONS

International Search Report and Written Opinion dated May 15, 2019 for PCT/EP2019/056003 filed on Mar. 11, 2019, 12 pages.
(Continued)

*Primary Examiner* — Man U Phan
(74) *Attorney, Agent, or Firm* — Xsensus LLP

(57) ABSTRACT

An infrastructure equipment of a wireless communications network is configured to act as a first relay node by determining an allocation of a first set of communications resources by the infrastructure equipment acting as a first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data from the first communications device to the donor node via the infrastructure equipment acting as the first relay node.

19 Claims, 8 Drawing Sheets

(58) Field of Classification Search
CPC . H04W 36/30; H04W 36/0085; H04W 36/32; H04W 36/00; H04L 5/00; H04L 5/0073; H04L 5/0051; H04L 5/0048; H04L 5/0035
USPC ......................................................... 370/329
See application file for complete search history.

(56) References Cited

U.S. PATENT DOCUMENTS

| | | | | |
|---|---|---|---|---|
| 8,681,652 | B2* | 3/2014 | Chang | H04W 28/20 370/252 |
| 10,136,466 | B2* | 11/2018 | Martin | H04W 88/04 |
| 10,349,334 | B2* | 7/2019 | Martin | H04W 36/30 |
| 10,433,269 | B2* | 10/2019 | Ng | H04W 56/001 |
| 10,856,266 | B2* | 12/2020 | Chen | H04W 72/005 |
| 2010/0167743 | A1* | 7/2010 | Palanki | H04B 7/2606 455/67.11 |
| 2019/0306777 | A1* | 10/2019 | Martin | H04W 36/30 |
| 2020/0337000 | A1* | 10/2020 | Kim | H04W 56/001 |

OTHER PUBLICATIONS

Holma, H. and Toskala, A., "System Architecture Based on 3GPP SAE," LTE for UMTS OFDMA and SC-FDMA based radio access, John Wiley and Sons, 2009, pp. 25-27.
NTT DOCOMO, Inc., "Revised WID on New Radio Access Technology," 3GPP TSG RAN Meeting No. 78, RP-172834 (revision of RP-172115), Lisbon, Portugal, Dec. 18-21, 2017, 11 pages.
ZTE, "Discussion on relay architecture supporting IAB," 3GPP TSG-RAN WG3 Meeting No. 99, R3-180792, Athens, Greece, Feb. 26-Mar. 2, 2018, 10 pages.

* cited by examiner

METHODS AND INFRASTRUCTURE EQUIPMENT

CROSS-REFERENCE TO RELATED APPLICATIONS

The present application is based on PCT filing PCT/EP2019/056003, filed Mar. 11, 2019, which claims priority to EP 18164439.4, filed Mar. 27, 2018, the entire contents of each are incorporated herein by reference.

BACKGROUND

Field of Disclosure

The present disclosure relates to methods and apparatus for the allocation of communications resources for the transmission of data on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

As radio technologies continue to improve, for example with the development of 5G ("New Radio"), the possibility arises for these technologies to be used not only by infrastructure equipment to provide service to wireless communications devices in a cell, but also for interconnecting infrastructure equipment to provide a wireless backhaul.

In view of this there is a need for a suitable means for allocating communications resources for the transmission of data by means of a wireless backhaul.

SUMMARY OF THE DISCLOSURE

The present disclosure can help address or mitigate at least some of the issues discussed above.

Embodiments of the present technique can provide an infrastructure equipment of a wireless communications network configured to act as a first relay node by determining an allocation of a first set of communications resources by the infrastructure equipment acting as a first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data from the first communications device to the donor node via the infrastructure equipment acting as the first relay node. The infrastructure equipment is configured to transmit an indication of the first set of communications resources to the other infrastructure equipment acting as the second relay node; to receive the uplink data from the first communications device, the uplink data having been transmitted by the other infrastructure equipment acting as the second relay node using the first set of communications resources; and to transmit the uplink data from the first communications device using a second set of communications resources different from the first set of communications resources.

Embodiments of the present technique can enable uplink data to be successfully transmitted from one node in a route to an adjacent node, the nodes being within a wireless communications range, while minimizing interference caused by transmissions by other nodes or by other communications devices which are within wireless communications range of the receiving node.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Radio Access Technology (4G)

Figure 1:
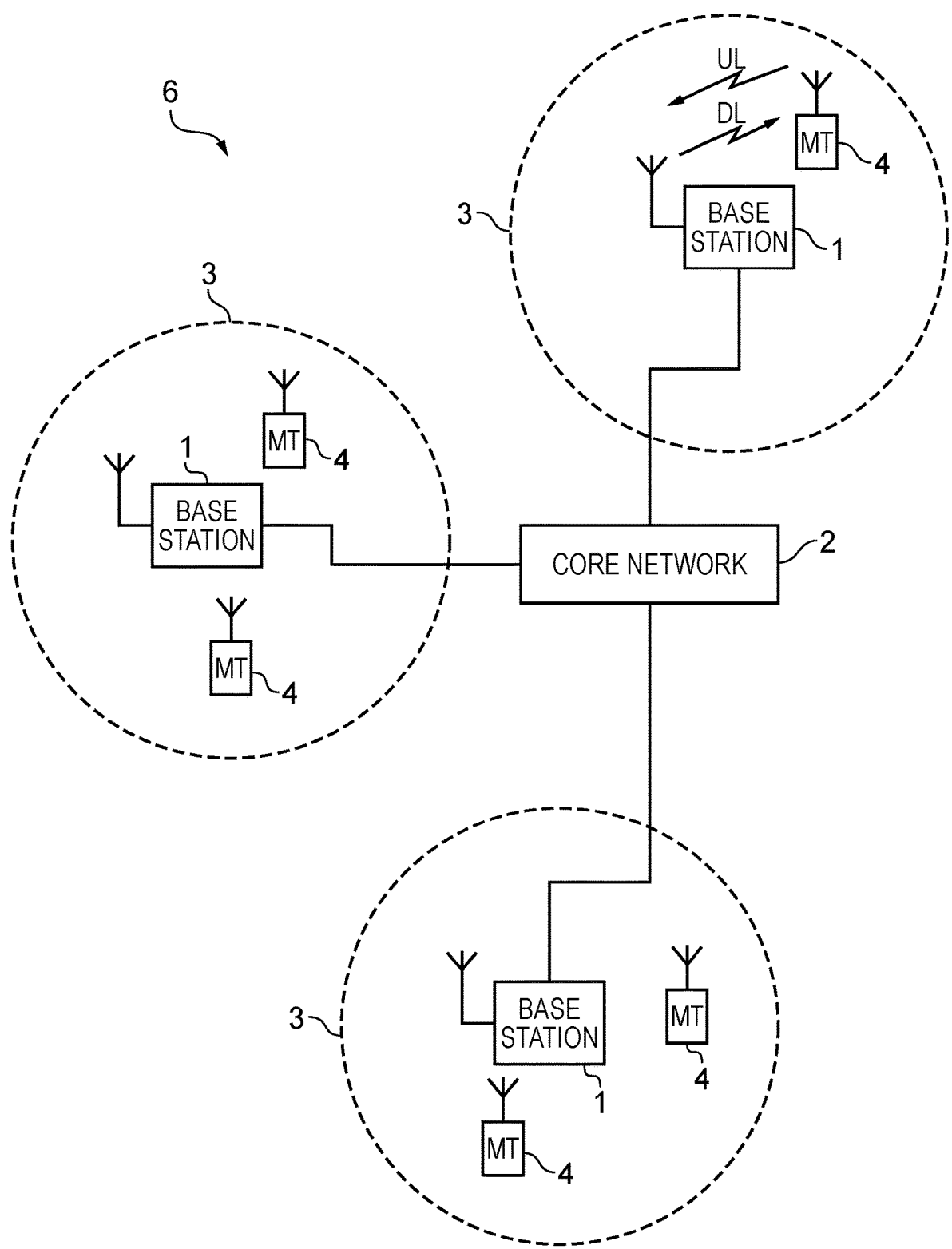
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
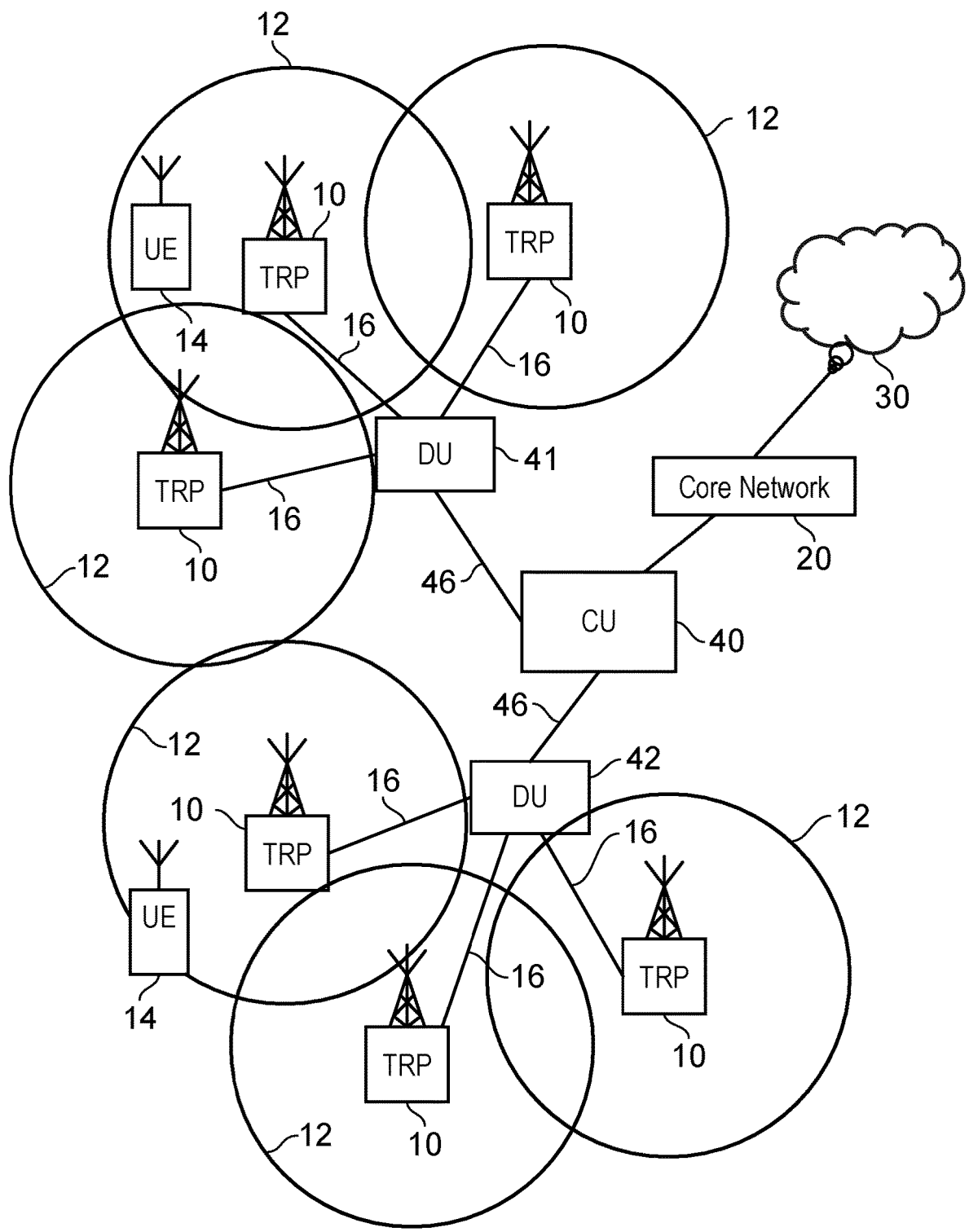
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a line 12. As such wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
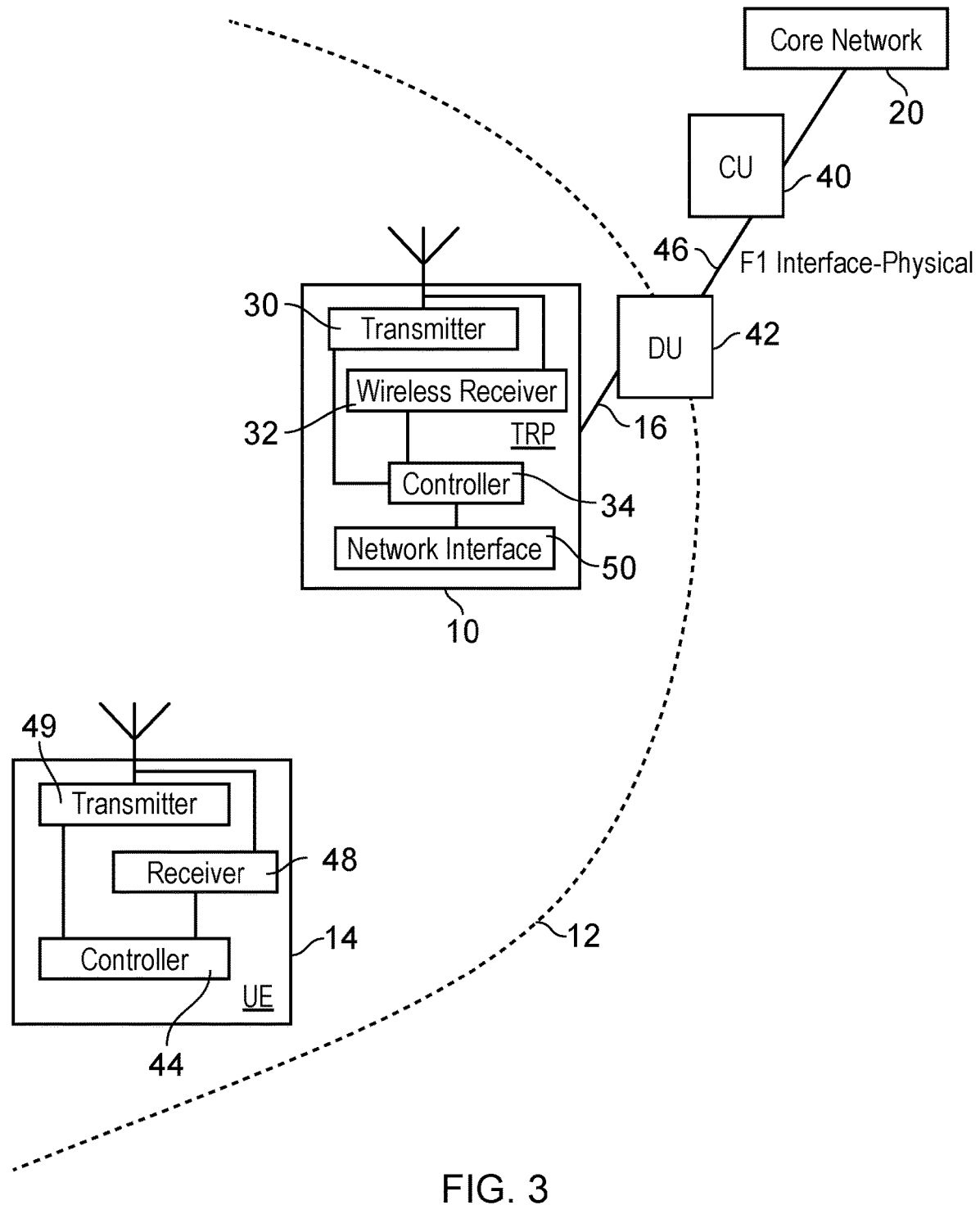
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3 a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation. The transmitters 30, 49 and the receivers 32, 48 may include radio frequency filters and amplifiers as well as signal processing components and devices in order to transmit and receive radio signals in accordance for example with the 5G standard.

The controllers 34, 44 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3 the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection to the core network can be generally referred to as a backhaul comprising the interface 16 from the network interface 50 of the TRP10 to the DU 42 and the F1 interface 46 from the DU 42 to the CU 40.

Figure 4:
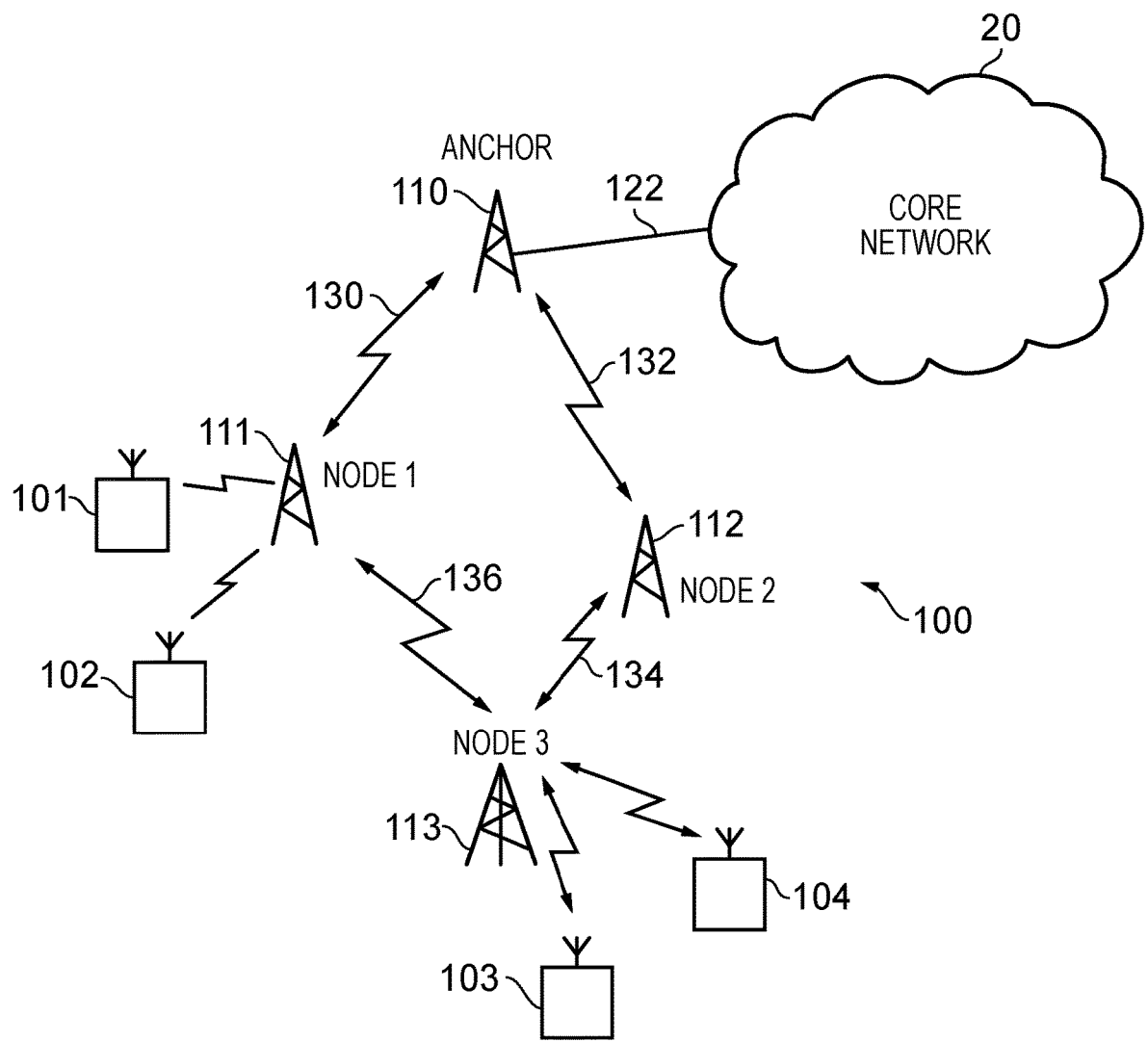
FIG. 4 schematically represents some aspects of a wireless telecommunication network which may be configured to operate in accordance with certain embodiments of the present disclosure.

Example embodiments of the present technique which can be formed from a wireless communications network corresponding to that shown in FIG. 1 or 2 is shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101-104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110-113 in FIG. 4 may correspond broadly to the TRPs 10 of FIG. 2 and FIG. 3.

The first infrastructure equipment 110 in FIG. 4 is connected to the core network 20 by means of one or a sequence of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111-113 in FIG. 4 may each comprise a TRP, broadly similar in functionality to the TRPs 10 of FIG. 2.

In some embodiments of the present technique, one or more of the second to fourth infrastructure equipment 111-113 in FIG. 4 may further comprise a DU 42, and in some embodiments of the present technique, one or more of the second to fourth infrastructure equipment 110-113 may comprise a DU and a CU.

In some embodiments of the present technique, the CU 40 associated with the first infrastructure equipment 110 may perform the function of a CU not only in respect of the first infrastructure equipment 110, but also in respect of one or more of the second, the third and the fourth infrastructure equipment 111-113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity which forms a part of a route for the transmission of the uplink data or the downlink data.

An infrastructure equipment which is physically connected to the core network and operated in accordance with an example embodiment may provide communications resources to other infrastructure equipment and so is referred to as a 'donor node'. An infrastructure equipment which acts as an intermediate node (i.e. one which forms a part of the route but is not acting as a donor node) is referred to as a 'relay node'. The relay node at the end of the route which is the infrastructure equipment controlling the cell in which the communications device is obtaining service is referred to as an 'end node'.

In the wireless network illustrated in FIG. 4, each of the first to fourth infrastructure equipment 110-113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20

For clarity in the following description, the infrastructure equipment 110 is referred to below as the 'donor node', the first infrastructure equipment 111 is referred to below as 'Node 1', the second infrastructure equipment 112 is referred to below as 'Node 2' and the third infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink data from a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example embodiments are described in which each of the nodes is an infrastructure equipment; the present disclosure is not so limited. A node may comprise at least a transmitter, a receiver and a controller. In some embodiments of the present technique, the functionality of a node (other than the donor node) may be carried out by a communications device, which may be the communications device 4 (of FIG. 1) or 14 (of FIG. 2), adapted accordingly. As such, in some embodiments of the present technique, a route may comprise one or more communications devices. In other embodiments, a route may consist of only a plurality of infrastructure equipment.

In some embodiments of the present technique, an infrastructure equipment acting as a node may not provide a wireless access interface for the transmission of data to or by a communications device other than as part of an intermediate transmission along a route.

In some embodiments of the present technique, a route is defined considering a wireless communications device (such as the wireless communications device 104) as the start of a route. In other embodiments a route is considered to start at an infrastructure equipment which provides a wireless access interface for the transmission of the uplink data by a wireless communications device.

In order for the uplink data to be successfully transmitted from one node in a route to an adjacent node, the nodes must be within a wireless communications range. However, in order to ensure reliable reception of the uplink data, interference caused by transmissions by other nodes or by other communications devices which are within wireless communications range of the receiving node must be minimized. In particular, it is preferable that transmissions of the uplink data from one node to another do not coincide with transmissions of other uplink data by another node, if the two transmissions could result in a high probability of one or both of the transmissions being incorrectly or unsuccessfully received (for example, because they overlap in both time and frequency, or because simultaneous transmission and reception by a single node is not practical).

To enable the transmission of the uplink data along a route, there is thus a need for communications resources to be allocated for the transmission of the uplink data from one node to another. According to example embodiments of the present technique, there is therefore provided a method of operating an infrastructure equipment of a wireless communications network.

The method comprises determining an allocation of a first set of communications resources by the infrastructure equipment acting as a first relay node for another infrastructure equipment acting as a second relay node, the communications resources for transmitting uplink data from a first communications device to an infrastructure equipment connected to a core network part of the wireless communications network acting as a donor node.

The allocation of the first set of communications resources for the other infrastructure equipment acting as the second relay node is based upon a donor set of communications resources allocated by the donor node for communicating the uplink data from the first communications device to the donor node via the infrastructure equipment acting as the first relay node. The method further comprises transmitting an indication of the first set of communications resources to the other infrastructure equipment acting as the second relay node, receiving the uplink data from the first communications device, the uplink data having been transmitted by the other infrastructure equipment acting as the second relay node using the first set of communications resources and transmitting the uplink data from the first communications device using a second set of communications resources different from the first set of communications resources.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some embodiments, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some embodiments, a wireless access interface used for the transmission of data from one node to another uses a first technique and a wireless access interface used for the transmission of data between an infrastructure equipment acting as a node and a communications device may use a second technique different from the first. In some embodiments, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified general packet radio service (GPRS)/enhanced data rates for global system for mobile communications (GSM) evolution (EDGE) ("2G"), wideband code division multiple access (WCDMA) universal mobile telecommunications system (UMTS) and related standards such as HSPA (high speed packet access) and HSPA+ ("3G"), LTE (long term evolution) and related standards including LTE-A ("4G"), and new radio access technology (NR) ("5G"). Techniques that may be used to provide a wireless access interface include one or more of time division multiple access (TDMA), frequency division multiple access FDMA, orthogonal frequency division multiple access OFDMA, single carrier frequency division multiple access SC-FDMA, code division multiple access CDMA. Duplexing (i.e. the transmission over a wireless link in two directions) may be by means of frequency division duplexing (FDD) or time division duplexing (TDD) or a combination of both.

In some embodiments of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

As described above in respect of FIG. 3, a physical interface 46 may connect a DU 41 and a CU 40. In some embodiments, one DU 41 may be associated with the donor node 110, and a different DU 41 may be associated with another infrastructure equipment, such as for example the Node 1 111. In such embodiments, a logical F1 connection may be realised between a CU 40 associated with an donor node and a DU 41 associated with the Node 1 111 by means of a combination of the physical interface 46 connecting the CU 40 to the DU 41 associated with the donor node 110, the interface 16 connecting the DU 41 associated with the donor node 110 with the TRP 10 associated with the donor node 110, and one or more of the inter-node wireless communications links 130, 132, 134, 136.

A wireless access interface may provide communications resources which can be allocated by any appropriate method to an individual transmission or a group of transmissions. For example, the communications resources may be characterised by one or more of a time period, a range of frequencies and a code sequence. Generally, transmissions using communications resources which are mutually orthogonal may be successfully distinguished from each other by appropriate signal processing techniques at the receiving entity.

A communications resource allocation may therefore comprise a set of communications resources for a particular purpose. The communications resource allocation may be characterised in any manner appropriate to the technology and/or standard used for the corresponding wireless access interface. For example, a communications resource allocation in an OFDM-based wireless access interface may be characterised by a time period (which may be expressed in terms of OFDM symbols) and one or more sub-carriers in the frequency domain. In some embodiments, the communications resources may comprise a bandwidth part, that is to say, a contiguous portion of the frequency resources which are assigned for the exclusive use of the operator of the wireless communications network, which may be allocated for an uninterrupted time period.

A communications resource allocation may comprise a periodic repetition. For example, an allocation may comprise a set of sub-carriers for the duration of a sub-frame (or some portion thereof), in each sub-frame N where N mod Tperiod=A, where Tperiod is the periodicity of the allocation and A is an offset value. The number of repetitions or the duration for which the allocation remains valid may be limited.

According to embodiments of the present technique, the communications resources are allocated to the infrastructure equipment 110-113 within the wireless communications network 100 for the transmission of the uplink data originating at one or more of the mobile communications devices 101-104. As described above, uplink data refers to data which originates at a mobile communications device and is transmitted via a wireless access interface provided by an infrastructure equipment controlling a cell in which the mobile communications device is obtaining service. The uplink data is then transmitted, directly or indirectly, to a core network.

For example, the uplink data originating at the fourth communications device 104 is transmitted initially to the Node 3 113, via the wireless access interface provided by the Node 3 113, and is subsequently transmitted via the donor node 110 to the core network 20. The ultimate destination of the uplink data may be within the core network 20, may be another mobile communications device, or may be any other destination which is reachable via the core network 20 (e.g. via the public switched telephony network or via the internet).

In the embodiments of the present technique, the communications resources allocated to each infrastructure equipment for the uplink data transmission are a subset of communications resources (referred to as donor resources) identified by the infrastructure equipment 110 acting as the donor node.

The communications resource allocations are transmitted through the radio access network in a 'downstream' direction, that is, away from the donor node.

As described above, in some embodiments, there may be multiple routes from an infrastructure equipment to the donor node 110. For example, in FIG. 4, the Node 3 113 may transmit the uplink data to the donor node 111 via either, or both of, the Node 1 111 and the Node 2 112. In such circumstances, the Node 3 113 may receive communications resource allocations from either or both of the Node 1 111 and the Node 2112.

Figure 5:
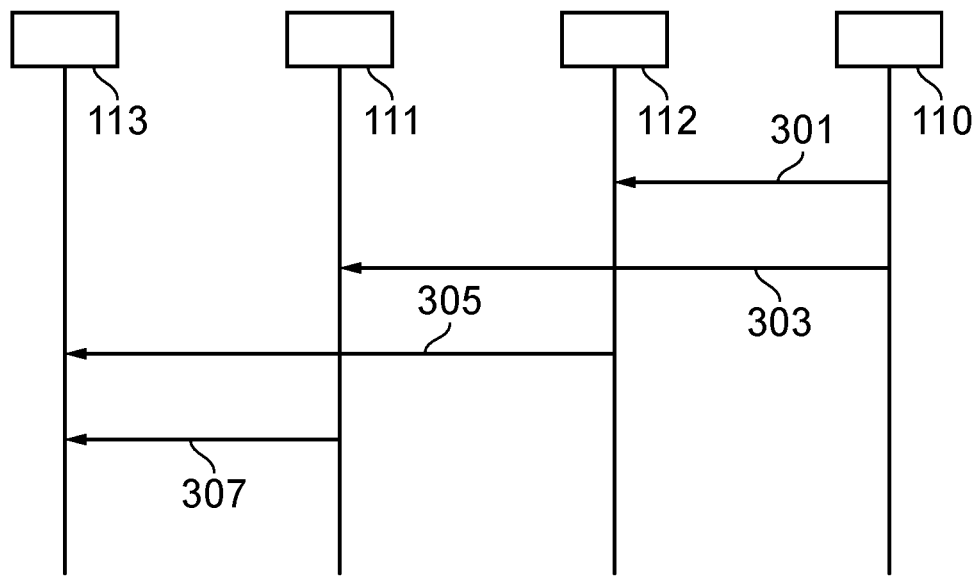
FIG. 5 illustrates a message sequence chart showing communications between infrastructure equipment in accordance with embodiments of the present disclosure.

FIG. 5 illustrates signalling between infrastructure equipment by which the communications resource allocations may be transmitted.

According to example embodiments of the present technique, a process of transmitting the uplink data starts (not illustrated) with the determination (not illustrated) by the donor node 110 of the route or routes by which the uplink data, which originates at the wireless communications device 104, is to be transmitted.

The route may start at the wireless communications device 104, or at the particular infrastructure node 113 controlling the cell in which the wireless communications device 104 is being served.

Based on the route determination, the donor node 110 determines the donor resources to be used within the radio access network for the transmission of the uplink data. The donor resources may be the communications resources to be used collectively by the nodes which are in the route or routes (e.g. the Node 1 111, the Node 2 112 and the Node 3 113, if they each form a node in the route or routes).

The donor node 110 then transmits a first communications resource allocation indication 301 indicating communications resources to the Node 2 112. The indicated communications resources are described in more detail below.

Based on the first communications resource allocation indication 301, the Node 2 112 determines which of the indicated communications resources are to be used for (i.e. are allocated for) the transmission of the uplink data from the Node 2 112 to the donor node 110.

Subsequently, the Node 2 112 transmits to the Node 3 113 a second communications resource allocation indication 305 indicating the communications resources allocated for the transmission of the uplink data from the Node 3 113 to the Node 2 112.

Similarly, a third communications resource allocation indication 303 of an allocation of communications resources may be transmitted by the donor node 110 to the Node 1 111. Then, based on the received third communications resource allocation indication 303, the Node 1 111 determines the communications resources which are allocated for the transmission of the uplink data from the Node 1 111 to the donor node 110. Subsequently, the Node 1 111 transmits to the Node 3 113 an indication 307 of the communications resources allocated for the transmission of the uplink data from the Node 3 113 to the Node 2 111.

The communications resource allocation indications 301, 303, 305, 307 may be transmitted by means of dedicated radio resource control (RRC) signalling or by means of transmissions (such as Downlink Control Information (DCI) messages) on a physical downlink control channel (PDCCH). A format for the messages may provide for the indication of the communications resources and the node or interface to which they are allocated.

Although each of the indications in FIG. 5 are shown as a single transmission, the techniques described herein are not so limited. For example, where an allocation of the communications resources comprises a plurality of contiguous regions (in both the time and frequency domains), each contiguous region may be indicated in a separate transmission.

Figure 6:
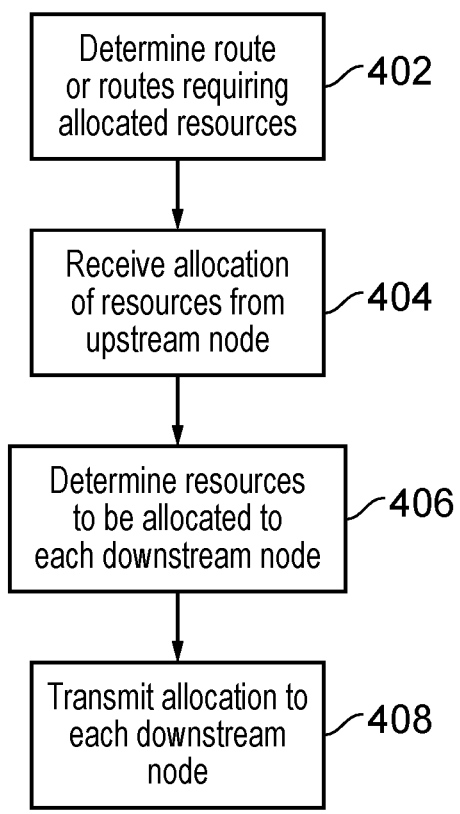
FIG. 6 illustrates a process flow for an infrastructure equipment in accordance with embodiments of the present technique.

FIG. 6 is a flow chart of a process which may be carried out by a node (which, in the present description may be an infrastructure equipment such as the infrastructure equipment acting as the Node 1 111), according to an example embodiment of the present technique.

The process in FIG. 6 starts at step 402, in which the infrastructure equipment 111 determines a route or routes requiring an allocation of the communications resources.

In step 404, the infrastructure equipment 111 receives an indication of a set of the communications resources from an upstream node. As described above, the upstream node may be a donor node such as the donor node 110.

In step 406, based on the received indication, the infrastructure equipment 111 determines the communications resources to be allocated to each downstream node (for example, to the infrastructure equipment acting as the Node 3 113). The infrastructure equipment 111 may also determine the communications resources to be used for its own transmissions of the uplink data according to the route.

In step 408, the infrastructure equipment 111 transmits to each of its downstream nodes (in the example, the Node 3 113) an indication of the communications resources for the transmission of the uplink data.

The steps in FIG. 6 may be carried out in a different order, and one or more steps may be omitted or varied. In particular, where the process of FIG. 6 is carried out by an infrastructure equipment acting as a donor node (such as the infrastructure equipment acting as the donor node 110), then step 404 may instead comprise determining the donor resources, from which all of the communications resources to be allocated for the route or routes are to be selected.

As such, the communications resources which are allocated in step 406 may be based on the donor resources allocated by the donor node. In some such embodiments, the donor resources are known to each infrastructure equipment carrying out the process illustrated in FIG. 6.

Similarly, where the process of FIG. 6 is carried out by an infrastructure equipment acting as a donor node, then no allocation of the communications resources for transmission to an upstream node is required, since the donor node is connected to the core network.

In some embodiments, a centralised approach to communications resource allocation may be taken. That is, the communications resource allocation for each of the nodes 111-113, or for each of the inter-node wireless communications links 130, 132, 134, 136, is determined by the donor node 110. As such, each communications resource allocation indication transmitted by the donor node 110 to a recipient infrastructure equipment contains an indication of the communications resources to be used by (or available for) each downstream node (including the recipient infrastructure equipment) which forms a hop in a route which also includes the recipient infrastructure equipment.

Figure 8A:
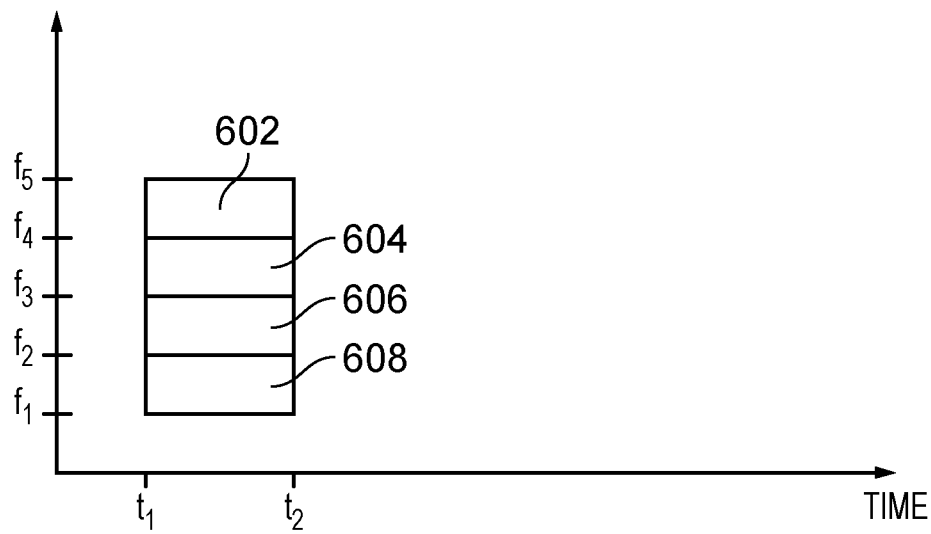
FIG. 8A and FIG. 8B illustrate graphically communications resource allocations according to an example of the present technique.

For example, the Node 3 113 has two routes for the uplink data: Node 3-Node 2-Donor Node, and Node 3-Node 1-Donor Node. With reference to FIG. 8A, which illustrates a possible allocation of the communications resources by a donor node in accordance with a centralised allocation scheme, the donor node 110 may first determine the donor resources as being those bounded by the times t1 and t2, and by the frequencies f1 and f5. The donor node 110 may then allocate the communications resources from the donor resources as follows:

First communications resources 608 are bounded by a time period t1 to t2 and carrier frequencies f1 and f2, for transmission of the uplink data from the Node 3 113 to the Node 2 112 via the inter-node wireless communications link 134;

Second communications resources 606 are bounded by the time period from t1 to t2 and carrier frequencies f2 and f3, for transmission of the uplink data from the Node 2 112 to the donor node 110 via the inter-node wireless communications link 132;

Third communications resources 604 are bounded by the time period from t1 to t2 and carrier frequencies f3 and f4, for transmission of the uplink data from the Node 3 113 to the Node 1 111 via the inter-node wireless communications link 136; and Fourth communications resources 602 are bounded by the time period from t1 to t2 and carrier frequencies f4 and f5, for transmission of uplink data from the Node 1 111 to the donor node 110 via the inter-node wireless communications link 130.

Each of the messages 301 and 303 transmitted by the donor node to the Node 2 and the Node 1 respectively indicate the communications resource allocations for both the respective recipient node (Node 2 or Node 1) and for the Node 3 for its transmissions to the Node2 and the Node 1 respectively.

For example, the message 301 from the donor node 110 to the Node 2 112 indicates that the first communications resources 608 and the second communications resources 606 are allocated for the inter-node wireless communications links 134 and 132 respectively.

The message 302 from the donor node 110 to the Node 1 111 indicates that the third communications resources 604 and fourth communications resources 602 are allocated for the inter-node wireless communications links 136 and 130 respectively. The message 305 from the Node 2 112 to the Node 3 113 indicates that the first communications resources 608 are allocated for the inter-node wireless communications link 134. An inter-node wireless communications link may be identified in the signalling by reference to an identifier of the downstream node; for example, the inter-node wireless communications link 130 may be identified by a reference to an identifier of the Node 1 111.

In some embodiments, each node forwards only an indication of the communications resources which are allocated to downstream nodes, thereby ensuring that the allocation messages are compact. In some embodiments, each node forwards indications of communications resources which are allocated to downstream nodes and to one or more of the forwarding node and its upstream nodes. As such, in some embodiments, nodes may be aware of only their own allocations and those of their downstream nodes; in other embodiments, nodes may be aware of allocations of additional nodes in the topology.

Some infrastructure equipment may have downstream nodes which does not form a part of any route; for example, in FIG. 4, the Node 2 112 is downstream of the donor node 110, however no communications devices are being served by the Node 2 112 and it may have been determined that the only route for the uplink data from the Node 3 113 to the donor node is via the Node 1 111. In such a case, according to some embodiments, the upstream node (the donor node 110 in this example) may transmit communications resource allocation messages only to those nodes (infrastructure equipment) which form part of a route for the uplink data.

In some embodiments, in such cases, the upstream node (the donor node 110 in this example) transmits communications resource allocation messages only to a downstream node (infrastructure equipment) if the inter-node wireless communications link between the downstream node and the upstream node forms part of a route for the uplink data.

In some embodiments, the centralised communications resource allocations are communicated to the various infrastructure equipment by means of broadcast transmissions by the donor node. Additionally or alternatively, subsequent transmissions by downstream nodes may be broadcast. A physical resource to broadcast the control data indicating the communications resource allocations can be pre-determined in specification. In order to avoid unnecessary transmissions, a maximum number of onward (i.e. forwarded) retransmissions may be specified, either in an appropriate specification, or by the donor node.

Accordingly, the allocation of communications resources to each node in the topology may be determined by the donor node.

In some embodiments, a hierarchical approach to communications resource allocation may be used. In such embodiments, in general, each node (other than the donor node) which is on a route for the transmission of the uplink data receives an allocation of communications resources from its immediate upstream node(s).

The receiving node then partitions the indicated communications resources and allocates a portion for its own use, and a portion for the use of each node which is immediately downstream of it within the topology. An indication of the allocated portions of the communications resources are then transmitted to the respective downstream nodes. The process repeats until all nodes which are on a route for the uplink data have received an allocation of communications resources.

The receiving node may allocate all or only a portion of the indicated communications resources.

If a node has no node which is immediately downstream of it within the topology, then it may allocate all of the indicated communications resources for its own use.

The donor node 110, having by definition no upstream node, determines a communications resource allocation for each downstream node i.e. those which are adjacent to it in the route topology. In other words, the donor node 110 determines a communications resource allocation of communications resources for each of the Node 1 111 and the Node 2 112 for which the donor node 110 is the immediate next-hop on a route for the uplink data from one or more communications devices.

Figure 8B:
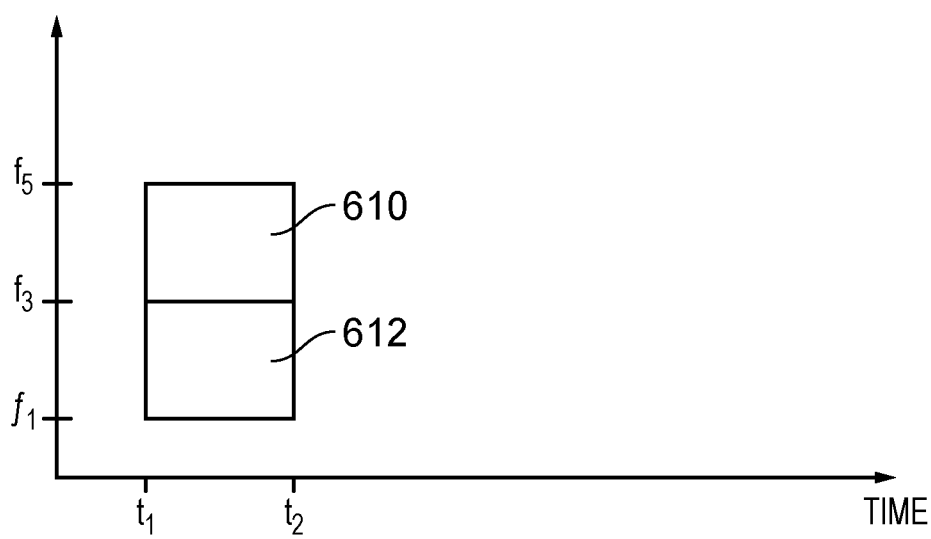

In the example of FIG. 4 and FIG. 5, the donor node 110 may allocate in message 303 communications resources 610 (illustrated in FIG. 8B, bounded by the times t1 and t2, and by frequencies f3 and f5) for the Node 1 111 and, in message 301, communications resources 612 bounded by the times t1 and t2 and by frequencies f1 and f3 for the Node 2 112.

Subsequently, the Node 2 112 may partition the communications resources 612, allocating those resources between frequencies f2 and f3 (i.e. communications resources 606 of FIG. 8A) for its own use in transmitting the uplink data towards the donor node 210, and allocating those resources between the frequencies f1 and f2 (i.e. communications resources 608 of FIG. 8A) to the Node 3 113, for the transmission of the uplink data by the Node 3 113 to the Node 2 112 or, if the Node 3 113 had further downstream nodes, for the allocation by the Node 3 113 to those downstream nodes.

The Node 2 112 may then transmit in message 305 an indication of the allocation of the communications resources 608 to the Node 3 113. Similarly, the Node 1 111 may apportion the communications resources 610 and may transmit in message 307 an indication of the communications resources which it has allocated to the Node 3 113 or infrastructure equipment downstream of the Node 3.

Although shown as single, contiguous (in time and frequency) communications resources in FIGS. 5A and 5B, any of the allocation of communications resources and the donor resources may comprise a plurality of disjoint communications resources, and in particular, may repeat in time and/or frequency.

Accordingly, the allocation of communications resources to each infrastructure equipment is carried out in a distributed manner.

In a hierarchical allocation scheme, various techniques within the scope of the present disclosure may be used to allocate communications resources from an upstream node to a downstream node.

According to a first such technique, communications resources may be allocated in response to the receipt of an allocation of communications resources from an upstream node. As such, communications resources may be available in advance of when the uplink data is to be transmitted. When an infrastructure node receives the uplink data, originating from a wireless communications device and for transmission to the core network via an infrastructure equipment acting as a donor node, the infrastructure node receiving the uplink data may transmit it using the allocated communications resources, without needing to request communications resources from an upstream node. In order to avoid wasted communications resources, preferably the allocated communications resources provide a small amount of bandwidth, which may be increased in response to their use.

According to a second technique, communications resources may be allocated on demand, i.e. in response to a request received from the downstream node.

For example, a downstream node may transmit a scheduling request (SR) to the allocating (upstream) node. In some embodiments, the upstream node may transmit an indication of communications resources allocated for a transmission of a buffer status report (BSR) by the requesting infrastructure equipment. The requesting infrastructure equipment may transmit a BSR indicating one or more of a total quantity of the uplink data to be transmitted, an amount of the uplink data currently stored in a buffer of the infrastructure equipment, and a bandwidth amount. In response to receiving the BSR, the allocating infrastructure equipment may transmit (e.g. as described above in respect of FIG. 5) an indication of communications resources allocated for the transmission of the uplink data by the requesting infrastructure equipment.

Figure 7:
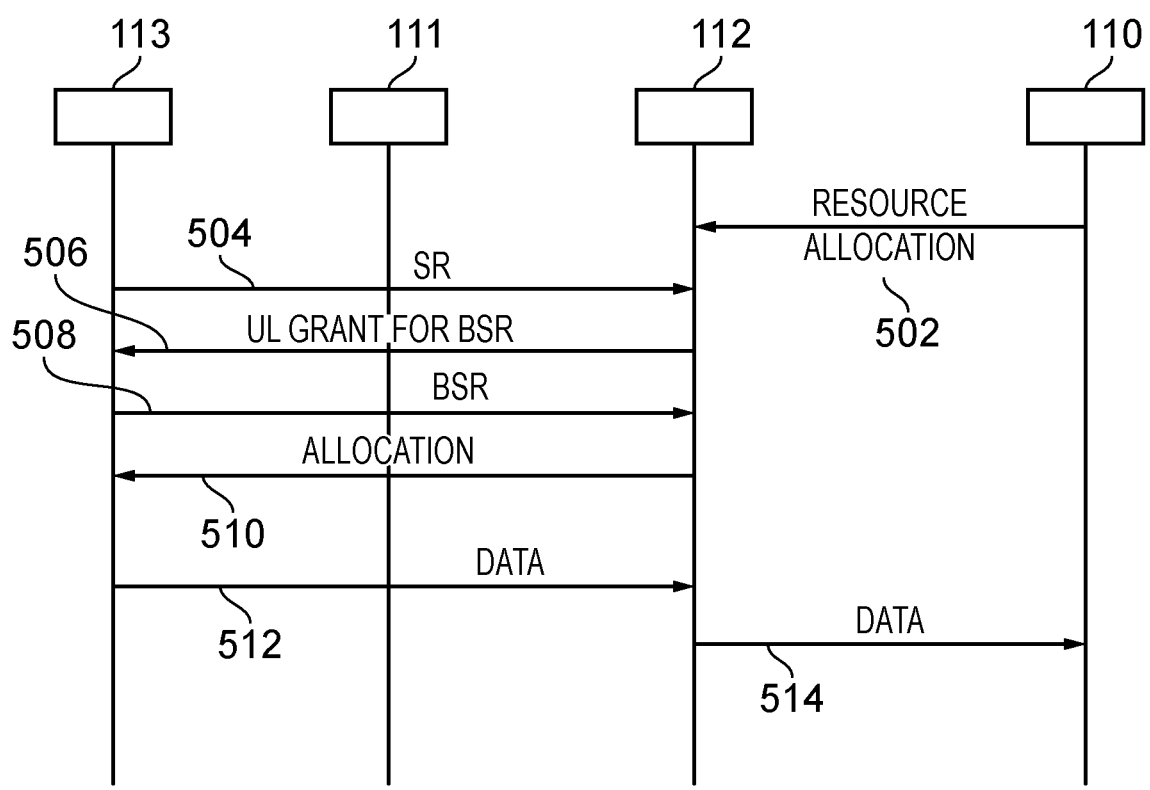
FIG. 7 illustrates a message sequence chart showing communications between infrastructure equipment in accordance with embodiments of the present disclosure.

A message sequence diagram illustrating this procedure is shown in FIG. 7. The Node 2 112 receives an allocation of communications resources 502 from an upstream node, which may be the donor node 110. A downstream node, which may be the Node 3 113 determines that communications resources for the transmission of the uplink data are required from the Node 2 112, and the Node 3 113 transmits a scheduling request 504 to the Node 2 112. The Node 2 112 responds by allocating communications resources for the transmission of an indication of a quantity of communications resources being requested, which may be in the form of a buffer status report (BSR). The allocation is indicated to the Node 3 113 in a message 506. Using the communications resources indicated in the message 506, the Node 3 113 transmits the indication of the quantity of communications resources being requested (e.g. in the form of a BSR) in a message 508. The Node 2 112 then allocates the communications resources for the transmission of the uplink data and indicates these to the Node 3 113 in message 510.

At 512, the Node 3 113 then transmits the uplink data using the communications resources indicated in message 510. The transmission 512 may be a single transmission or a plurality of transmissions, according to the communications resources allocated and the quantity of the uplink data to be transmitted.

Subsequently, the Node 2 112 transmits the uplink data 514 to its upstream node 110. The Node 2 112 may employ a similar procedure as described above (i.e. including a sequence of messages similar to the messages 504, 506, 508, 510 sent between the Node 2 112 and the Node 3 113) to obtain communications resources for the transmission 514 of the uplink data.

According to some embodiments of the second technique, if there are no communications resource available (that is to say, allocated for) the transmission of the scheduling request, then the requesting infrastructure equipment may initiate a random access channel (RACH) procedure by transmitting a random access request message on a random access channel. Preferably, in order to reduce delays in obtaining an uplink communications resource allocation for the transmission of the uplink data and to minimise the need for a RACH procedure, the allocating infrastructure equipment allocates frequent communications resources for the transmission of scheduling requests.

According to a third technique, an infrastructure equipment may allocate a portion of the communications resources indicated in a message received from an upstream node for contention-based access by one or more downstream nodes. For example, in response to receiving the indication 303 of the communications resources allocated by the donor node 110, the Node 1 111 may transmit the indication 307 downstream to the Node 3 113, the indication

307 identifying communications resources allocated for contention-based uplink access.

In some embodiments of the third technique the indication 307 identifying the communications resources for contention-based access is transmitted as part of broadcast system information.

In some embodiments of the third technique the communications resources for the contention-based access may be used by both infrastructure equipment and by wireless communications devices.

In some embodiments of the third technique, a device (which may be an infrastructure equipment or, in some embodiments, may be a wireless communications device) which determines that it has uplink data for transmission to the core network, transmits using the communications resources allocated for contention-based access either a request for dedicated communications resources for the subsequent transmission of the uplink data, or some or all of the uplink data.

In some embodiments, in response to successfully decoding a transmission sent by a device using the contention-based communications resources, the receiving infrastructure equipment may allocate dedicated communications resources for subsequent transmission of the uplink data by the device. In some embodiments, in response to successfully decoding two or more transmissions sent simultaneously (or at least overlapping in time) by devices using the contention-based communications resources, the receiving infrastructure equipment may allocate dedicated communications resources for subsequent transmission of the uplink data by each of the devices.

In some embodiments, the communications resource allocations may be adapted over time. For example, in the centralised approach, the donor node 110 may increase or decrease the quantity of communications resources allocated to a particular node or route in response to one or more of traffic demand, network load, and radio conditions associated with the wireless access interfaces making up the route. In the hierarchical approach, any of the donor node 110 or the relay nodes (such as the Node 1 111 or the Node 2 112) which allocate resources to downstream nodes may increase or decrease the quantity of communications resources allocated to a particular node or route in response to one or more of traffic demand, network load, and radio conditions associated with the wireless access interfaces making up the route.

In some embodiments of the present technique, an infrastructure equipment may transmit the uplink data towards the core network using allocated communications resources, after it has received an indication of the allocated communications resources.

In some further embodiments, an infrastructure equipment may transmit the uplink data towards the core network using allocated communications resources which have been activated. In other words, the uplink data may be transmitted by an infrastructure equipment only after it has received both an indication of the allocated communications resources and an indication that some or all of the allocated communications resources have been activated.

In some embodiments, the indication that some or all of the allocated communications resources have been activated may comprise a medium access control (MAC) control element (CE). In some embodiments, the indication that some or all of the allocated communications resources have been activated may comprise downlink control information (DCI) transmitted on a physical downlink control channel.

In some further embodiments, an infrastructure equipment may transmit the uplink data towards the core network using communications resources, only after it has received both an indication of the allocated communications resources and an indication that some or all of the allocated communications resources have been activated and while no indication that the activated communications resources have been deactivated has been received.

In some embodiments, communications resources that have been allocated but are not activated (or have since been deactivated) may be used for the transmission of the uplink data by a wireless communications device.

In some embodiments, an allocation of communications resources comprises a dynamic uplink grant of the communications resources to be used for the transmission of the uplink data via a particular route.

Where multi-connectivity is used then, in a preferred embodiment, each route is dynamically allocated communications resources by means of DCI. If the amount of dynamically allocated communications resources exceeds the amount needed to transmit the uplink data, an infrastructure node may indicate this by, in a portion of the communications resources, transmitting one or more MAC protocol data units (PDUs) comprising padding or not transmitting at all.

If the amount of dynamically allocated communications resources is insufficient to transmit the uplink data, an infrastructure node may transmit an indication of this in a portion of the allocated communications resources. In some embodiments, such an indication may comprise a buffer status report or a signal transmitted in uplink control information (UCI).

In response to receiving an indication that the dynamically allocated communications resources either exceed, or are insufficient for the requirements of a downstream node, an upstream node (which may be acting as a donor node) may adjust the dynamically allocated communications resources accordingly.

In some scenarios where multi-connectivity is available, an infrastructure equipment acting as a relay node may have multiple upstream node from which it is receiving an allocation of communications resources. For example, in FIG. 4, the Node 3 113 may receive allocations from the Node 2 112 and from the Node 1 111. In some embodiments, a relay node may receive allocations for communications resources for the transmission of the uplink data to two or more upstream node. The relay node may determine a quantity or proportion of the uplink data to transmit using each of the allocations based on one or more of radio conditions applicable to the communications link between the relay node and each of the upstream node and a congestion level (which may be based on a determination of a delay experienced in respect of the uplink data).

According to some embodiments of the present technique, a means is provided for an infrastructure equipment acting as a relay node to request an allocation of communications resources from an infrastructure equipment (referred to herein as a candidate infrastructure equipment) which is not an upstream node of the relay node on an existing route.

In some embodiments, the infrastructure equipment acting as a relay node may receive from an upstream node a communications resource for communicating with the candidate infrastructure equipment (these resources are referred to as 'candidate request communications resources'). The candidate request communications resources may comprise, for example, a reserved preamble for use on a random access channel or an uplink grant of communications resources for the transmission of a request to the candidate infrastructure equipment. The resource may comprise a bandwidth part (BWP). The candidate request communications resources may be dedicated (i.e. for the sole use of the infrastructure equipment) or may be shared amongst two or more infrastructure equipment and thus be accessed in a contention-based manner. An appropriate format associated with the candidate request communications resources may be defined or configured, for example a format for a transmission using a physical uplink shared channel (PUSCH) or a physical uplink control channel (PUCCH).

If the candidate request communications resources are shared, it may be restricted to infrastructure equipment which are acting as relay nodes. Preferably, the candidate request communications resources may be valid for a duration such that the infrastructure equipment may use the resource at a time of its determination, or with a low delay.

An infrastructure equipment acting as a relay node may use the candidate request communications resources to initiate a procedure to request the allocation of communications resources for the transmission of the uplink data via the candidate infrastructure equipment, for example in response to a determination that radio conditions and/or a traffic load on an existing route are, or are likely to become, unsuitable for the transmission of the uplink data.

In response to receiving such a request the candidate infrastructure equipment may initiate a procedure to activate a new route in which the candidate infrastructure equipment acts as a relay node for the transmission of the uplink data. The candidate infrastructure equipment may allocate communications resources to the infrastructure equipment for the transmission of the uplink data to the candidate infrastructure equipment.

For example, the Node 3 113 of FIG. 4 may currently use a route via the Node 1 111 for the transmission of the uplink data to the donor node 110. The Node 1 111 may transmit to the Node 3 113 an indication of candidate request communications resources which may be used by the Node 3 113 to request communications resources from the Node 2 112 acting as the candidate infrastructure equipment.

The Node 3 113 may subsequently determine that radio conditions applicable to transmissions from the Node 3 113 to the Node 1 111 mean that the route via the Node 1 111 is unsuitable for the transmission of the uplink data. Based on this determination, the Node 3 113 initiates a request for resources from the candidate infrastructure equipment (i.e. the Node 2 112) using the candidate request communications resources previously indicated by the Node 1 111.

In some embodiments of the present technique, a request for a modification of a route or a request (such as a scheduling request) for an allocation of communications resources for the transmission of the uplink data to a candidate infrastructure equipment may be transmitted to an upstream node. In some embodiments, this request may be transmitted to the upstream node using communications resources which have been allocated for the purpose of transmitting the uplink data to the upstream node. This may be referred to as 'uplink pre-emption'.

The upstream node, if it is not the donor node, may forward this request along the route towards the donor node. This forwarding may also make use of uplink pre-emption. Accordingly, the donor node may receive the request and, in response, may allocate communications resources for the transmission of the uplink data to the candidate infrastructure equipment, according to any of the example techniques disclosed herein. Subsequently, the infrastructure node which initiated the request may transmit the uplink data using the newly allocated communications resources, via the candidate infrastructure equipment.

Figure 9:
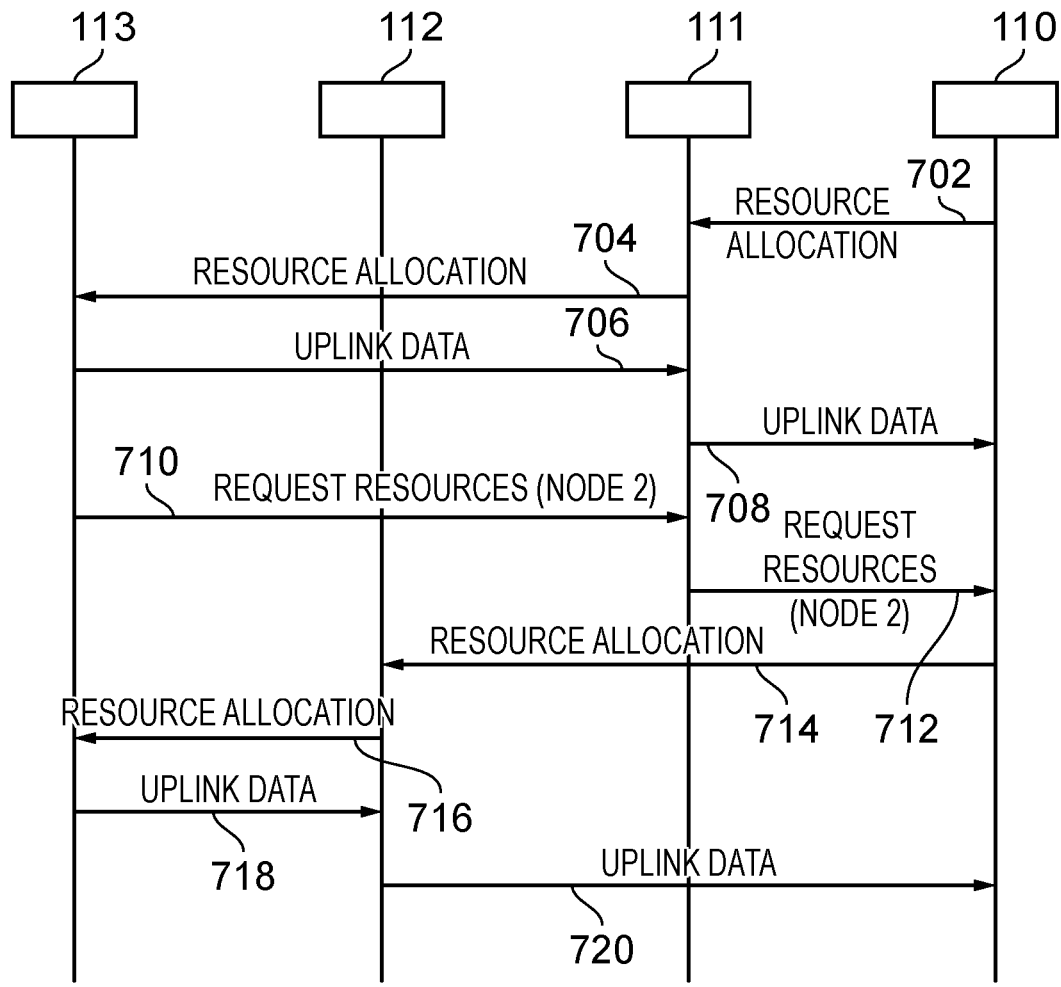
FIG. 9 illustrates a message sequence chart showing communications between infrastructure equipment according to an example of the present technique.

An example of this is illustrated in the message sequence chart shown in FIG. 9.

In steps 702 and 704, the communications resources are allocated from the donor resources for the transmission of the uplink data from the Node 3 113 to the donor node 110 via the Node 1 111. Subsequently, the uplink data is transmitted using the allocated communications resources (706, 708).

In response to a determination based on radio channel assessments, measurement reports, or any other suitable criteria that the route via the Node 1 111 is, or is becoming, unsuitable, the Node 3 113 transmits a request 710 for communications resources for the transmission of the uplink data via the Node 2 112, the Node 2 112 acting as a candidate node. This request is transmitted using the communications resources allocated at 704 i.e. resources which have been allocated for the transmission of the uplink data. As such, the Node 3 113 pre-empts the uplink data with the request.

The request 710 is received by the upstream node i.e. the Node 1 111. The Node 1 forwards (712) the request along the route towards the donor node. In the example of FIG. 9, the donor node 110 is thus the recipient of the forwarded request 712. This forwarding may also make use of uplink pre-emption of the communications resources allocated by message 702. Accordingly, the donor node 110 receives the request and, in response, allocates the communications resources for the transmission of the uplink data via the candidate infrastructure equipment the Node 2 112. Indications transmitted from the donor node 110 to the Node 2 112 (714) and from the Node 2 112 to the Node 3 113 (716) thus provide for the allocation of the communications resources for the transmission of the uplink data along a route comprising (in order) the Node 3 113, the Node 2 112, and the donor node 110. Accordingly, the uplink data is transmitted via this route (718, 720).

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment of a wireless communications network, the method comprising determining an allocation of a first set of communications resources by the infrastructure equipment acting as a first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data from the first communications device to the donor node via the infrastructure equipment acting as the first relay node, transmitting an indication of the first set of communications resources to the other infrastructure equipment acting as the second relay node;

receiving the uplink data from the first communications device, the uplink data having been transmitted by the other infrastructure equipment acting as the second relay node using the first set of communications resources; and transmitting the uplink data from the first communications device using a second set of communications resources different from the first set of communications resources.

Paragraph 2. A method according to Paragraph 1, the method comprising:

receiving an indication of a portion of the donor set of communications resources, the portion of the donor set of communications resources comprising the first set of communications resources and the second set of communications resources, wherein the determining the allocation of the first set of communications resources is in response to receiving the indication of the portion of the donor set of communications resources.

Paragraph 3. A method according to Paragraph 2, the method comprising:

determining an allocation of a third set of communications resources by the infrastructure equipment acting as the first relay node for another infrastructure equipment acting as a third relay node, the communications resources for transmitting uplink data from a second communications device to the infrastructure equipment acting as the donor node, and transmitting an indication of the third set of communications resources to the infrastructure equipment acting as the third relay node, wherein the portion of the donor set of communications resources comprises the third set of communications resources.

Paragraph 4. A method according to Paragraph 1, wherein:

determining the allocation of the first set of communications resources comprises receiving an indication of the first set of communications resources, the allocation of the first set of communications resources and the allocation of the second set of communications resources being carried out by the infrastructure equipment acting as the donor node.

Paragraph 5. A method according to Paragraph 4, wherein the indication of the first set of communications resources is transmitted by the infrastructure equipment acting as the donor node.

Paragraph 6. A method according to any of Paragraphs 1 to 5, the method comprising:

before receiving the uplink data, transmitting to the other infrastructure equipment acting as the second relay node an activation indication, the activation indication indicating that at least a portion of the first set of communications resources may be used for the transmission of the uplink data by the other infrastructure equipment acting as the second relay node.

Paragraph 7. A method according to any of Paragraphs 1 to 6, wherein the indication of the allocation of the first set of communications resources is transmitted in a radio resource control, RRC, message.

Paragraph 8. A method according to any of Paragraphs 1 to 6, wherein the indication of the allocation of the first set of communications resources is transmitted in a control signalling message transmitted on a Physical Downlink Control Channel Paragraph 9. A method according to any of Paragraphs 1 to 8 wherein the donor set of communications resources comprise a portion of a system bandwidth assigned for the exclusive use of an operator of the wireless communications network.

Paragraph 10. A method according to any of Paragraphs 1 to 9, wherein the first set of communications resources is allocated for contention-based access among a plurality of infrastructure equipment including the infrastructure equipment acting as the second relay node.

Paragraph 11. A method according to any of Paragraphs 1 to 10, the method comprising determining an allocation of a fourth set of communications resources by the infrastructure equipment acting as a first relay node for a plurality of infrastructure equipment including the infrastructure equipment acting as the second relay node for contention-based access, transmitting an indication of the fourth set of communications resources to the plurality of infrastructure equipment;

receiving from the infrastructure equipment acting as the second relay node a request, the request transmitted using the fourth set of communications resources, wherein the determining the allocation of the first set of communications resources is in response to the receiving the request.

Paragraph 12. A method according to any of Paragraphs 1 to 11, the method comprising:

determining at least one of a traffic demand, a network load, and a radio condition associated with a wireless access interface repeating the steps of determining the allocation of the first set of communications resources and transmitting the indication of the first set of communications resources to the other infrastructure equipment acting as the second relay node, wherein the allocation of the first set of communications resources is determined at least in part based on the determined at least one of the traffic demand, the network load, and the radio condition associated with the wireless access interface.

Paragraph 13. A method according to any of Paragraphs 1 to 12, the method comprising transmitting to the other infrastructure equipment acting as the second relay node an indication of a candidate request communications resource, the candidate request communications resource for initiating a procedure to request the allocation of communications resources for the transmission of the uplink data via a candidate infrastructure equipment acting as a fourth relay node wherein the candidate request communications resource comprises at least one of a reserved preamble for use on a random access channel or an uplink grant of communications resources for the transmission of a request to the candidate infrastructure equipment.

Paragraph 14. A method according to any of Paragraphs 1 to 13, the method comprising receiving from the other infrastructure equipment acting as the second relay node an indication of a request, the indication having been transmitted using the first set of communications resources, wherein the request is for a modification of a route or a request for an allocation of communications resources for the transmission of the uplink data from the first communications device.

Paragraph 15. A method of operating an infrastructure equipment connected to a core network part of a wireless communications network acting as a donor node for receiving uplink data transmitted by a communications device, the wireless communications network comprising
an infrastructure equipment acting as a first relay node and
an infrastructure equipment acting as a second relay node, the method comprising:
determining by the infrastructure equipment acting as the donor node that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
allocating by the infrastructure equipment acting as the donor node a first set of communications resources for the transmission of the uplink data by the infrastructure equipment acting as the second relay node;
allocating by the infrastructure equipment acting as the donor node a second set of communications resources for the transmission of the uplink data by the infrastructure equipment acting as the first relay node;
transmitting an indication of the allocation of the first set of communications resources and an indication of the allocation of the second set of communications resources to the infrastructure equipment acting as the first relay node from the infrastructure equipment acting as the donor node; and
receiving at the infrastructure equipment acting as the donor node the uplink data transmitted by the infrastructure equipment acting as the first relay node using the first set of communications resources.

Paragraph 16. A method of operating an infrastructure equipment connected to a core network part of a wireless communications network acting as a donor node for receiving uplink data transmitted by a communications device, the wireless communications network comprising
an infrastructure equipment acting as a first relay node and
an infrastructure equipment acting as a second relay node, the method comprising:
determining by the infrastructure equipment acting as the donor node that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
allocating by the infrastructure equipment acting as the donor node a first set of communications resources, the first set of communications resources for the transmission of the uplink data by the infrastructure equipment acting as the first relay node and for the transmission of the uplink data by the infrastructure equipment acting as the second relay node;
transmitting an indication of the allocation of the first set of communications resources to the infrastructure equipment acting as the first relay node;
receiving the uplink data transmitted by the infrastructure equipment acting as the first relay node to the infrastructure equipment acting as the donor node using the first set of communications resources.

Paragraph 17. An infrastructure equipment for acting as a first relay node of a wireless communications network, the infrastructure equipment comprising
a transmitter for transmitting radio signals via a wireless access interface of a radio access network part of the wireless communications network,
a receiver for receiving radio signals transmitted via the wireless access interface of the radio access network part, and
a controller configured
to determine an allocation of a first set of communications resources by the infrastructure equipment acting as the first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data from the first communications device to the donor node via the infrastructure equipment acting as the first relay node,
to control the transmitter to transmit an indication of the first set of communications resources to the other infrastructure equipment acting as the second relay node;
to control the receiver to receive the uplink data from the first communications device, the uplink data having been transmitted by the other infrastructure equipment acting as the second relay node using the first set of communications resources; and
to control the transmitter to transmit the uplink data from the first communications device using a second set of communications resources different from the first set of communications resources.

Paragraph 18. Circuitry for an infrastructure equipment for acting as a first relay node of a wireless communications network, the circuitry comprising
transmitter circuitry for transmitting radio signals via a wireless access interface of a radio access network part of the wireless communications network,
receiver circuitry for receiving radio signals transmitted via the wireless access interface of the radio access network part, and
controller circuitry configured
to determine an allocation of a first set of communications resources by the infrastructure equipment acting as the first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data from the first communications device to the donor node via the infrastructure equipment acting as the first relay node, to control the transmitter circuitry to transmit an indication of the first set of communications resources to the other infrastructure equipment acting as the second relay node;
to control the receiver circuitry to receive the uplink data from the first communications device, the uplink data having been transmitted by the other infrastructure equipment acting as the second relay node using the first set of communications resources; and
to control the transmitter circuitry to transmit the uplink data from the first communications device using a second set of communications resources different from the first set of communications resources.

Paragraph 19. An infrastructure equipment connected to a core network part of a wireless communications network acting as a donor node for receiving uplink data transmitted by a communications device, the wireless communications network comprising
an infrastructure equipment acting as a first relay node and
an infrastructure equipment acting as a second relay node, the infrastructure equipment acting as the donor node comprising:
a transmitter for transmitting radio signals via a wireless access interface of a radio access network part of the wireless communications network,
a receiver for receiving radio signals transmitted via the wireless access interface of the radio access network part, and
a controller configured
to determine that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
to allocate a first set of communications resources for the transmission of the uplink data by the infrastructure equipment acting as the second relay node;
to allocating a second set of communications resources for the transmission of the uplink data by the infrastructure equipment acting as the first relay node;
to control the transmitter to transmit an indication of the allocation of the first set of communications resources and an indication of the allocation of the second set of communications resources to the infrastructure equipment acting as the first relay node; and
to control the receiver to receive the uplink data transmitted by the infrastructure equipment acting as the first relay node using the first set of communications resources.

Paragraph 20. Circuitry for an infrastructure equipment connected to a core network part of a wireless communications network acting as a donor node for receiving uplink data transmitted by a communications device, the wireless communications network comprising
an infrastructure equipment acting as a first relay node and
an infrastructure equipment acting as a second relay node, the circuitry comprising:
transmitter circuitry for transmitting radio signals via a wireless access interface of a radio access network part of the wireless communications network,
receiver circuitry for receiving radio signals transmitted via the wireless access interface of the radio access network part, and
controller circuitry configured
to determine that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
to allocate a first set of communications resources for the transmission of the uplink data by the infrastructure equipment acting as the second relay node;
to allocating a second set of communications resources for the transmission of the uplink data by the infrastructure equipment acting as the first relay node;
to control the transmitter circuitry to transmit an indication of the allocation of the first set of communications resources and an indication of the allocation of the second set of communications resources to the infrastructure equipment acting as the first relay node; and
to control the receiver circuitry to receive the uplink data transmitted by the infrastructure equipment acting as the first relay node using the first set of communications resources.

Paragraph 21. An infrastructure equipment connected to a core network part of a wireless communications network acting as a donor node for receiving uplink data transmitted by a communications device, the wireless communications network comprising
an infrastructure equipment acting as a first relay node and
an infrastructure equipment acting as a second relay node, the infrastructure equipment acting as the donor node comprising:
a transmitter for transmitting radio signals via a wireless access interface of a radio access network part of the wireless communications network,
a receiver for receiving radio signals transmitted via the wireless access interface of the radio access network part, and
a controller configured
to determine that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
to allocate a first set of communications resources, the first set of communications resources for the transmission of the uplink data by the infrastructure equipment acting as the first relay node and for the transmission of the uplink data by the infrastructure equipment acting as the second relay node;
to control the transmitter to transmit an indication of the allocation of the first set of communications resources to the infrastructure equipment acting as the first relay node;
to control the receiver to receive the uplink data transmitted by the infrastructure equipment acting as the first relay node to the infrastructure equipment acting as the donor node using the first set of communications resources.

Paragraph 22. Circuitry for an infrastructure equipment connected to a core network part of a wireless communications network acting as a donor node for receiving uplink data transmitted by a communications device, the wireless communications network comprising an infrastructure equipment acting as a first relay node and
an infrastructure equipment acting as a second relay node, the circuitry comprising:
transmitter circuitry for transmitting radio signals via a wireless access interface of a radio access network part of the wireless communications network,
receiver circuitry for receiving radio signals transmitted via the wireless access interface of the radio access network part, and
controller circuitry configured
to determine that the uplink data from the communications device is to be transmitted by the infrastructure equipment acting as the second relay node to the infrastructure equipment acting as the first relay node, and is to be transmitted by the infrastructure equipment acting as the first relay node to the infrastructure equipment acting as the donor node;
to allocate a first set of communications resources, the first set of communications resources for the transmission of the uplink data by the infrastructure equipment acting as the first relay node and for the transmission of the uplink data by the infrastructure equipment acting as the second relay node;
to control the transmitter circuitry to transmit an indication of the allocation of the first set of communications resources to the infrastructure equipment acting as the first relay node;
to control the receiver circuitry to receive the uplink data transmitted by the infrastructure equipment acting as the first relay node to the infrastructure equipment acting as the donor node using the first set of communications resources.

REFERENCES

[1] Holma H. and Toskala A, "LTE for UMTS OFDMA and SC-FDMA based radio access", John Wiley and Sons, 2009
[2] RP-172834, "Revised WID on New Radio Access Technology," NTT DOCOMO, RAN #78

What is claimed is:

1. A method of operating an infrastructure equipment of a wireless communications network, the method comprising
determining an allocation of a first set of communications resources by the infrastructure equipment acting as a first relay node for another infrastructure equipment acting as a second relay node, the communications resources for transmitting uplink data from a first communications device to an infrastructure equipment connected to a core network part of the wireless communications network acting as a donor node, the allocation of the first set of communications resources for the other infrastructure equipment acting as the second relay node being based upon a donor set of communications resources allocated by the donor node for communicating the uplink data to the donor node via the infrastructure equipment acting as the first relay node,
transmitting an indication of the first set of communications resources to the other infrastructure equipment acting as the second relay node;
after transmitting the indication of the first set of communication resources to the other infrastructure equipment acting as the second relay node, transmitting to the other infrastructure equipment acting as the second relay node an activation indication, the activation indication indicating that at least a portion of the first set of communications resources may be used for the transmission of the uplink data by the other infrastructure equipment acting as the second relay node;
receiving the uplink data, the uplink data having been transmitted by the other infrastructure equipment acting as the second relay node using activated communication resources in the first set of communications resources; and
transmitting the uplink data using a second set of communications resources different from the first set of communications resources,
wherein, before the uplink data is transmitted by the other infrastructure equipment acting as the second relay node, the uplink data is transmitted by the first communication device.

2. A method according to claim 1, the method comprising:
receiving an indication of a portion of the donor set of communications resources, the portion of the donor set of communications resources comprising the first set of communications resources and the second set of communications resources, wherein
the determining the allocation of the first set of communications resources is in response to receiving the indication of the portion of the donor set of communications resources.

3. A method according to claim 2, the method comprising:
determining an allocation of a third set of communications resources by the equipment acting as a third relay node, the communications resources for transmitting uplink data from a second communications device to the infrastructure equipment acting as the donor node, and
transmitting an indication of the third set of communications resources to the infrastructure equipment acting as the third relay node,
wherein the portion of the donor set of communications resources comprises the third set of communications resources.

4. A method according to claim 1, wherein:
determining the allocation of the first set of communications resources comprises receiving an indication of the first set of communications resources, the first set of communications resources are allocated by the infrastructure equipment acting as the donor node and the second set of communications resources are allocated by the infrastructure equipment acting as the donor node.

5. A method according to claim 4, wherein the indication of the first set of communications resources is transmitted by the infrastructure equipment acting as the donor node.

6. A method according to claim 1, wherein the indication of the allocation of the first set of communications resources is transmitted in a radio resource control, RRC, message.

7. A method according to claim 1, wherein the indication of the allocation of the first set of communications resources is transmitted in a control signalling message transmitted on a Physical Downlink Control Channel.

8. A method according to claim 1 wherein the donor set of communications resources comprise a portion of a system bandwidth assigned for the exclusive use of an operator of the wireless communications network.

9. A method according to claim 1, wherein the first set of communications resources is allocated for contention-based access among a plurality of infrastructure equipment including the infrastructure equipment acting as the second relay node.

10. A method according to claim 1, the method comprising
   determining an allocation of a fourth set of communications resources by the infrastructure equipment acting as a first relay node for a plurality of infrastructure equipment including the infrastructure equipment acting as the second relay node for contention-based access,
   transmitting an indication of the fourth set of communications resources to the plurality of infrastructure equipment;
   receiving from the infrastructure equipment acting as the second relay node a request, the request transmitted using the fourth set of communications resources,
   wherein the determining the allocation of the first set of communications resources is in response to the receiving the request.

11. A method according to claim 1, the method comprising:
   determining at least one of a traffic demand, a network load, and a radio condition associated with a wireless access interface
   repeating the steps of determining the allocation of the first set of communications resources and transmitting the indication of the first set of communications resources to the other infrastructure equipment acting as the second relay node, wherein
   the allocation of the first set of communications resources is determined at least in part based on the determined at least one of the traffic demand, the network load, and the radio condition associated with the wireless access interface.

12. A method according to claim 1, the method comprising
   transmitting to the other infrastructure equipment acting as the second relay node an indication of a candidate request communications resource, the candidate request communications resource for initiating a procedure to request the allocation of communications resources for the transmission of the uplink data via a candidate infrastructure equipment acting as a fourth relay node
   wherein the candidate request communications resource comprises at least one of a reserved preamble for use on a random access channel or an uplink grant of communications resources for the transmission of a request to the candidate infrastructure equipment.

13. A method according to claim 1, the method comprising
   receiving from the other infrastructure equipment acting as the second relay node an indication of a request, the indication having been transmitted using the first set of communications resources, wherein
   the request is for a modification of a route or a request for an allocation of communications resources for the transmission of the uplink data from the first communications device.

14. A method of operating an infrastructure equipment connected to a core network part of a wireless communications network acting as a donor node for receiving uplink data transmitted by a communications device, the wireless communications network comprising
   an infrastructure equipment acting as a first relay node and
   an infrastructure equipment acting as a second relay node, the method comprising:
   determining by the infrastructure equipment acting as the donor node that the uplink data is to be transmitted by the infrastructure equipment acting as the second relay node to the infrastructure equipment acting as the first relay node, and is to be transmitted by the infrastructure equipment acting as the first relay node to the infrastructure equipment acting as the donor node;
   allocating by the infrastructure equipment acting as the donor node a first set of communications resources for the transmission of the uplink data by the infrastructure equipment acting as the second relay node;
   allocating by the infrastructure equipment acting as the donor node a second set of communications resources for the transmission of the uplink data by the infrastructure equipment acting as the first relay node;
   transmitting an indication of the allocation of the first set of communications resources and an indication of the allocation of the second set of communications resources to the infrastructure equipment acting as the first relay node from the infrastructure equipment acting as the donor node;
   after transmitting the indication of the first set of communication resources to the other infrastructure equipment acting as the second relay node, transmitting to the other infrastructure equipment acting as the second relay node an activation indication, the activation indication indicating that at least a portion of the first set of communications resources may be used for the transmission of the uplink data by the other infrastructure equipment acting as the second relay node; and
   receiving at the infrastructure equipment acting as the donor node the uplink data transmitted by the infrastructure equipment acting as the first relay node using activated communication resources in the first set of communications resources,
   wherein, before the uplink data is transmitted by the other infrastructure equipment acting as the second relay node, the uplink data is transmitted by the communication device.

15. A method of operating an infrastructure equipment connected to a core network part of a wireless communications network acting as a donor node for receiving uplink data transmitted by a communications device, the wireless communications network comprising
   an infrastructure equipment acting as a first relay node and
   an infrastructure equipment acting as a second relay node, the method comprising:
   determining by the infrastructure equipment acting as the donor node that the uplink data is to be transmitted by the infrastructure equipment acting as the second relay node to the infrastructure equipment acting as the first relay node, and is to be transmitted by the infrastructure equipment acting as the first relay node to the infrastructure equipment acting as the donor node;
   allocating by the infrastructure equipment acting as the donor node a first set of communications resources, the first set of communications resources for the transmission of the uplink data by the infrastructure equipment acting as the first relay node and for the transmission of the uplink data by the infrastructure equipment acting as the second relay node;
   transmitting an indication of the allocation of the first set of communications resources to the infrastructure equipment acting as the first relay node;
   after transmitting the indication of the first set of communication resources to the other infrastructure equipment acting as the second relay node, transmitting to the other infrastructure equipment acting as the second relay node an activation indication, the activation indication indicating that at least a portion of the first set of communications resources may be used for the transmission of the uplink data by the other infrastructure equipment acting as the second relay node; and receiving the uplink data transmitted by the infrastructure equipment acting as the first relay node to the infrastructure equipment acting as the donor node using the first set of communications resources, wherein, before the uplink data is transmitted b the other infrastructure equipment acting as the second relay node, the uplink data is transmitted by the communication device.

16. A method according to claim 15, the method comprising determining an allocation of a fourth set of communications resources by the infrastructure equipment acting as a first relay node for a plurality of infrastructure equipment including the infrastructure equipment acting as the second relay node for contention-based access, transmitting an indication of the fourth set of communications resources to the plurality of infrastructure equipment;

receiving from the infrastructure equipment acting as the second relay node a request, the request transmitted using the fourth set of communications resources, wherein the determining the allocation of the first set of communications resources is in response to the receiving the request.

17. A method according to claim 15, the method comprising receiving from the other infrastructure equipment acting as the second relay node an indication of a request, the indication having been transmitted using the first set of communications resources, wherein the request is for a modification of a route or a request for an allocation of communications resources for the transmission of the uplink data from the communications device.

18. A method according to claim 14, the method comprising determining an allocation of a fourth set of communications resources by the infrastructure equipment acting as a first relay node for a plurality of infrastructure equipment including the infrastructure equipment acting as the second relay node for contention-based access, transmitting an indication of the fourth set of communications resources to the plurality of infrastructure equipment;

receiving from the infrastructure equipment acting as the second relay node a request, the request transmitted using the fourth set of communications resources, wherein the determining the allocation of the first set of communications resources is in response to the receiving the request.

19. A method according to claim 14, the method comprising receiving from the other infrastructure equipment acting as the second relay node an indication of a request, the indication having been transmitted using the first set of communications resources, wherein the request is for a modification of a route or a request for an allocation of communications resources for the transmission of the uplink data from the communications device.

* * * * *